United States Patent [19]
Kai et al.

[11] Patent Number: 5,029,106
[45] Date of Patent: Jul. 2, 1991

[54] PATTERN DATA GENERATING SYSTEM

[75] Inventors: Naoyuki Kai, Tokyo; Masahide Ohhashi, Yokohama; Tsutomu Minagawa, Fujisawa, all of Japan

[73] Assignee: Kabushiki Kaisha Toshiba, Kawasaki, Japan

[21] Appl. No.: 302,711

[22] Filed: Jan. 27, 1989

[30] Foreign Application Priority Data

Jan. 30, 1988 [JP] Japan .................................. 63-20317

[51] Int. Cl.⁵ .............................................. G06F 15/66
[52] U.S. Cl. .................... 364/518; 340/728; 340/747
[58] Field of Search ........................ 364/518, 521, 522; 382/44–48; 340/721, 723, 728, 744

[56] References Cited

U.S. PATENT DOCUMENTS

| 4,620,288 | 10/1986 | Welmers | 364/518 |
| 4,831,557 | 5/1989 | Murata | 364/521 |
| 4,887,228 | 12/1989 | Robert | 364/521 |

FOREIGN PATENT DOCUMENTS 63-20314  1/1988  Japan .
63-20316  1/1988  Japan .

OTHER PUBLICATIONS

"Principles of Interactive Computer Graphics (Second Edition)", Newman et al.; McGraw-Hill, Inc., 1979, pp. 230–239.
"The Edge Flag Algorithm-A Fill Method for Raster Scan Displays", B. D. Ackland, N. H. Weste, IEEE Transactions on Computers, vol. 30, No. 1, Jan. 1981, pp. 41–47.
Japanese Patent Publication No. 53-41017.
Japanese Patent Publication No. 53-15624.

*Primary Examiner*—Heather R. Herndon
*Attorney, Agent, or Firm*—Finnegan, Henderson, Farabow, Garrett and Dunner

[57] ABSTRACT

A pattern data generating system has a processor for writing in a bit map memory, on the basis of input data, points of all lines to be filled or painted along a scan direction which is one direction on the bit map memory. This writing is performed such that a point on each line is written as one of the two end points of the line thereof while a point, offset by one point in the scan direction, is written as the other of the two end points of the line. The pattern data generating system also has a pattern data generating circuit for, if w (w is a positive integer) points b0, b1, ..., b(w−2), and b(w−1) are present on one scan line, writing EXOR of data of points b0, b1, ..., b(j−1) at positions corresponding to points b(j) (j is not less than 0 and less than w). Similar EXOR data writing is performed by the pattern data generating circuit for all the scan lines. Then, pattern data, in which the area surrounded by the closed curve is filled or painted, is obtained.

14 Claims, 9 Drawing Sheets

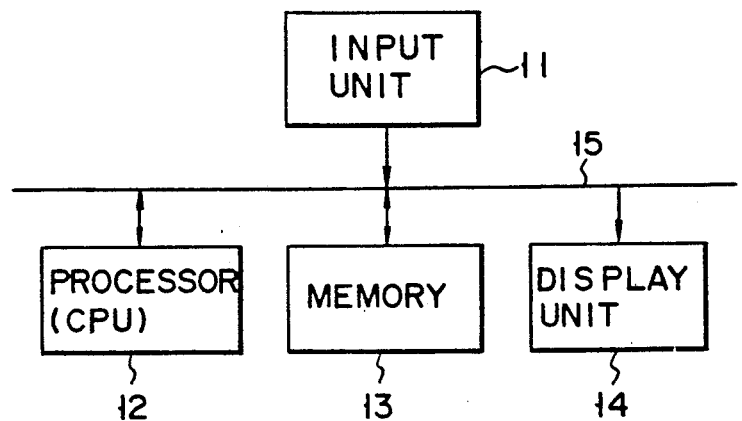
FIG. 2
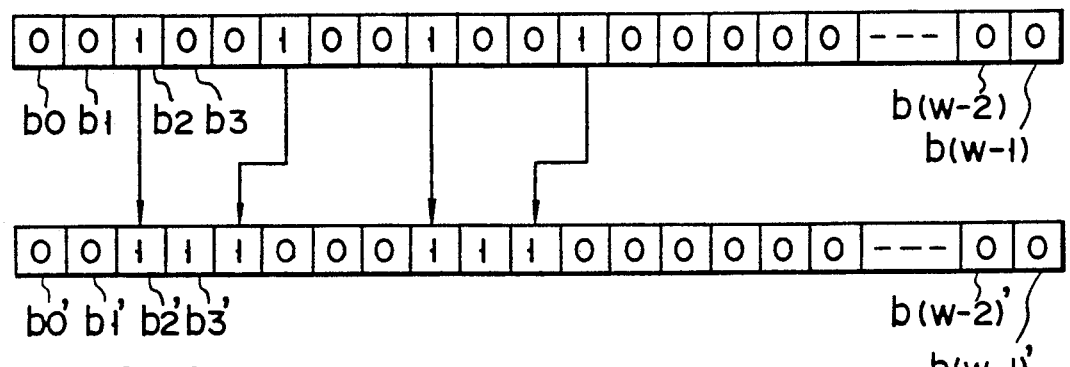
FIG. 4A
FIG. 4B
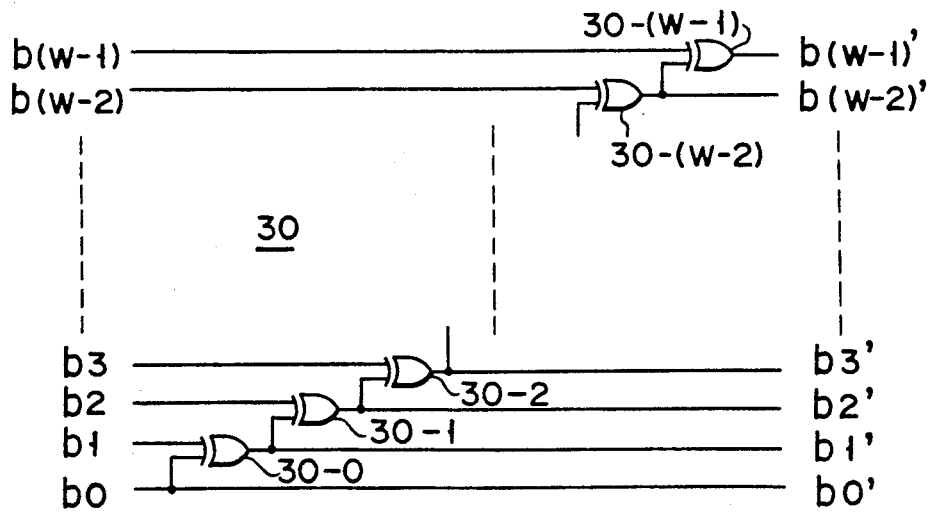
FIG. 4C

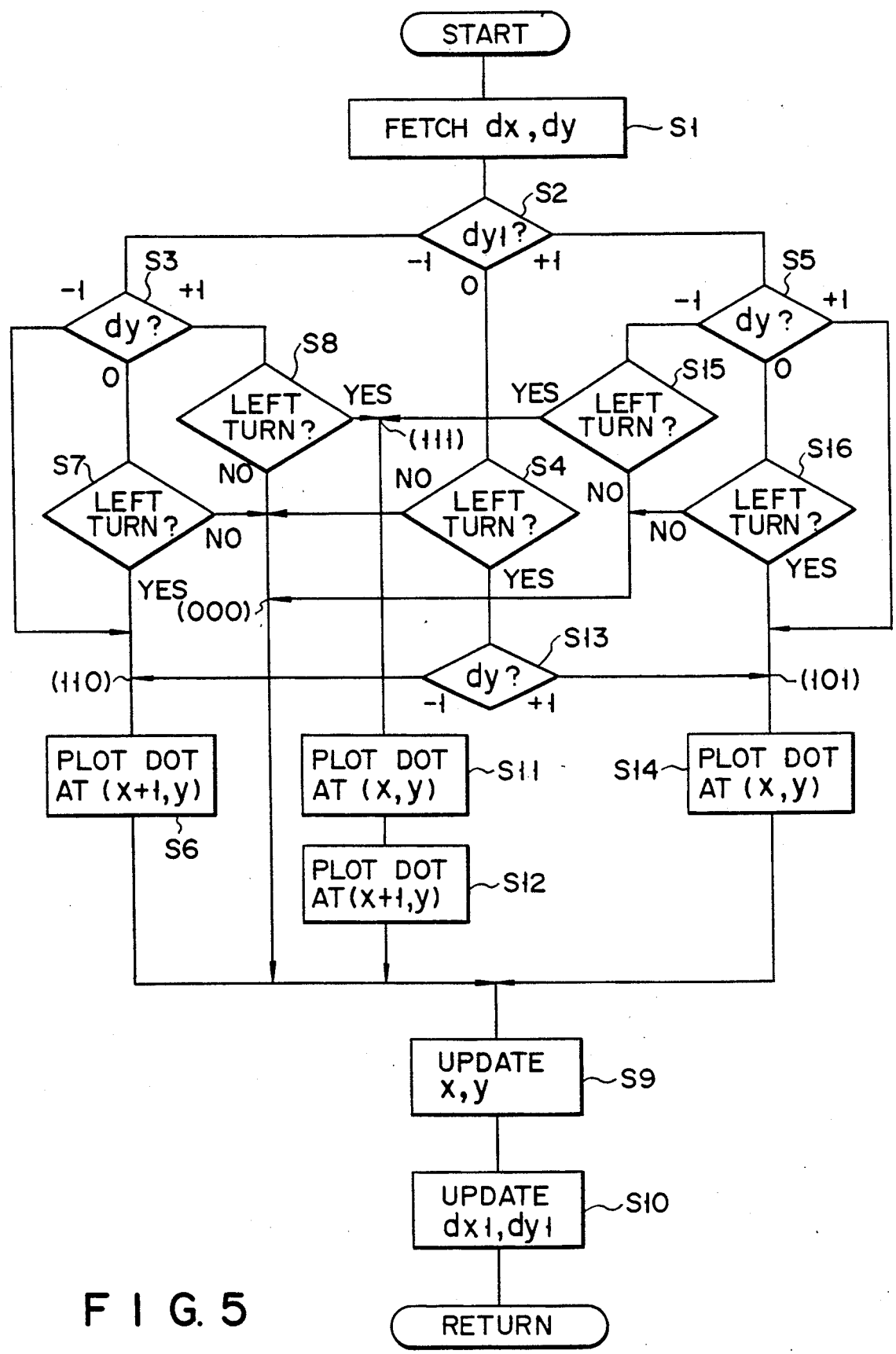
F I G. 5

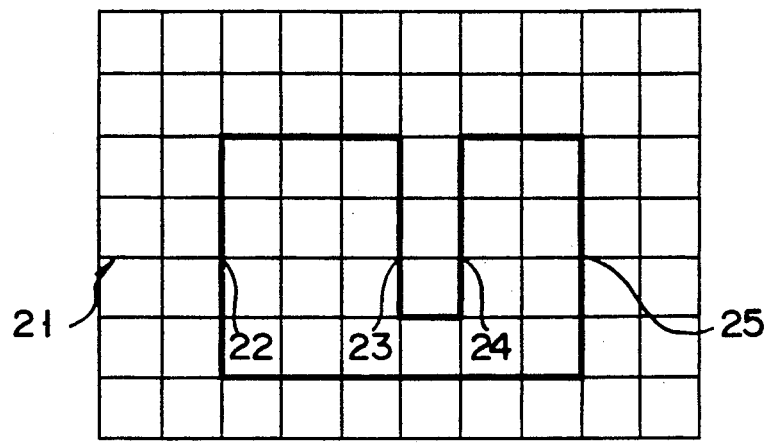
F I G. 6A
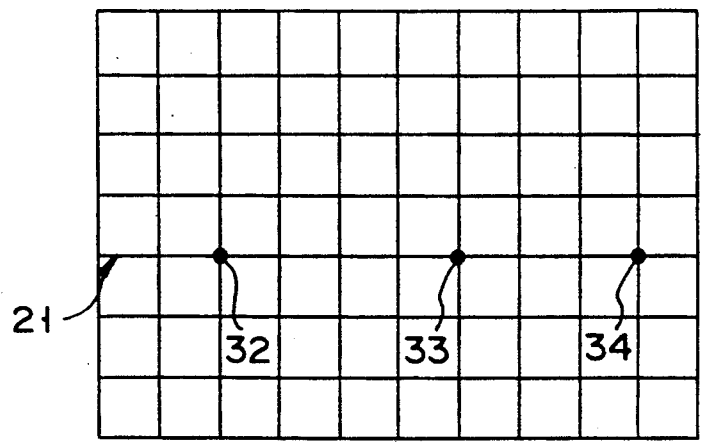
F I G. 6B
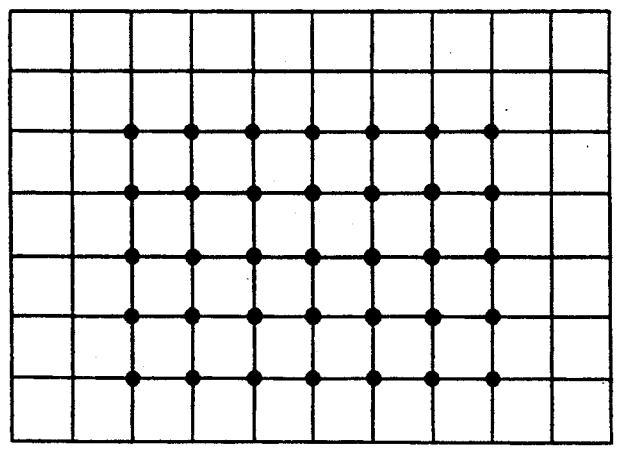
F I G. 6C

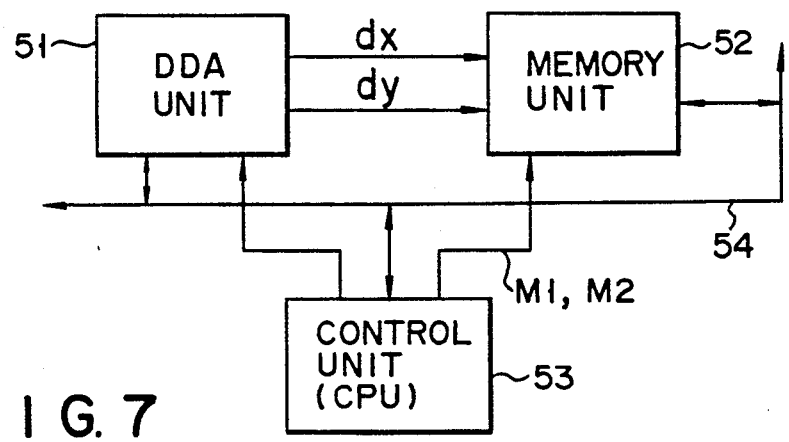
F I G. 7
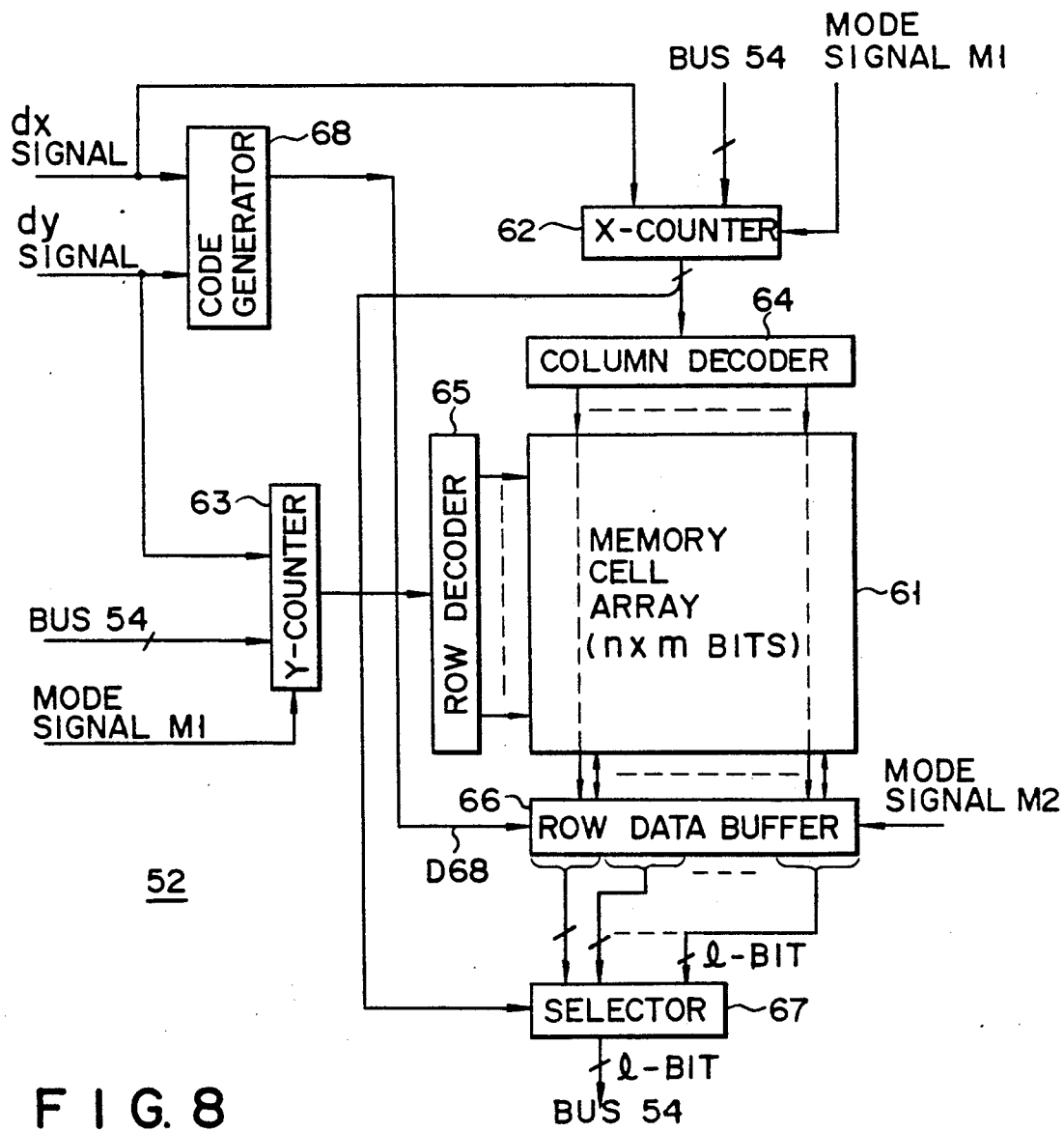
F I G. 8

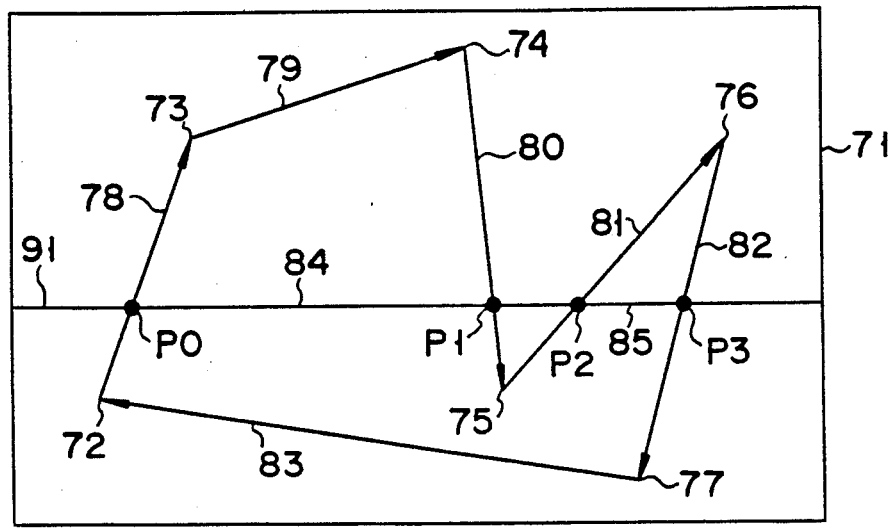
F I G. 10
(PRIOR ART)
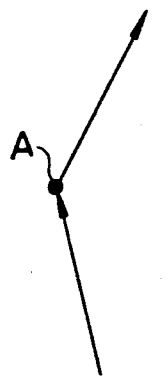
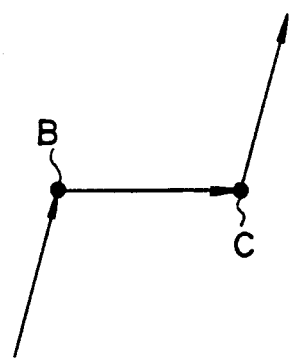
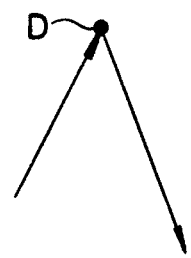
F I G. 11A　　　F I G. 11B　　　F I G. 11C
(PRIOR ART)　　(PRIOR ART)　　(PRIOR ART)

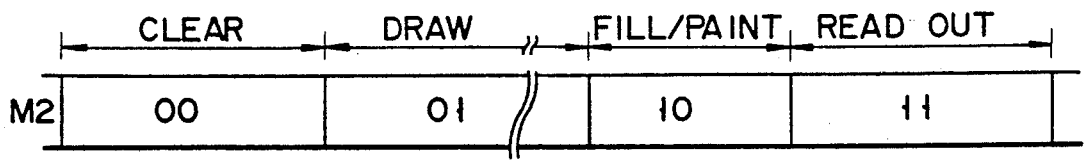
F I G. 12A
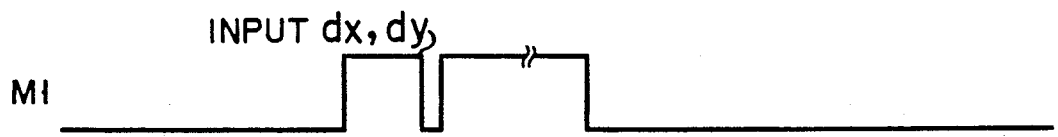
F I G. 12B
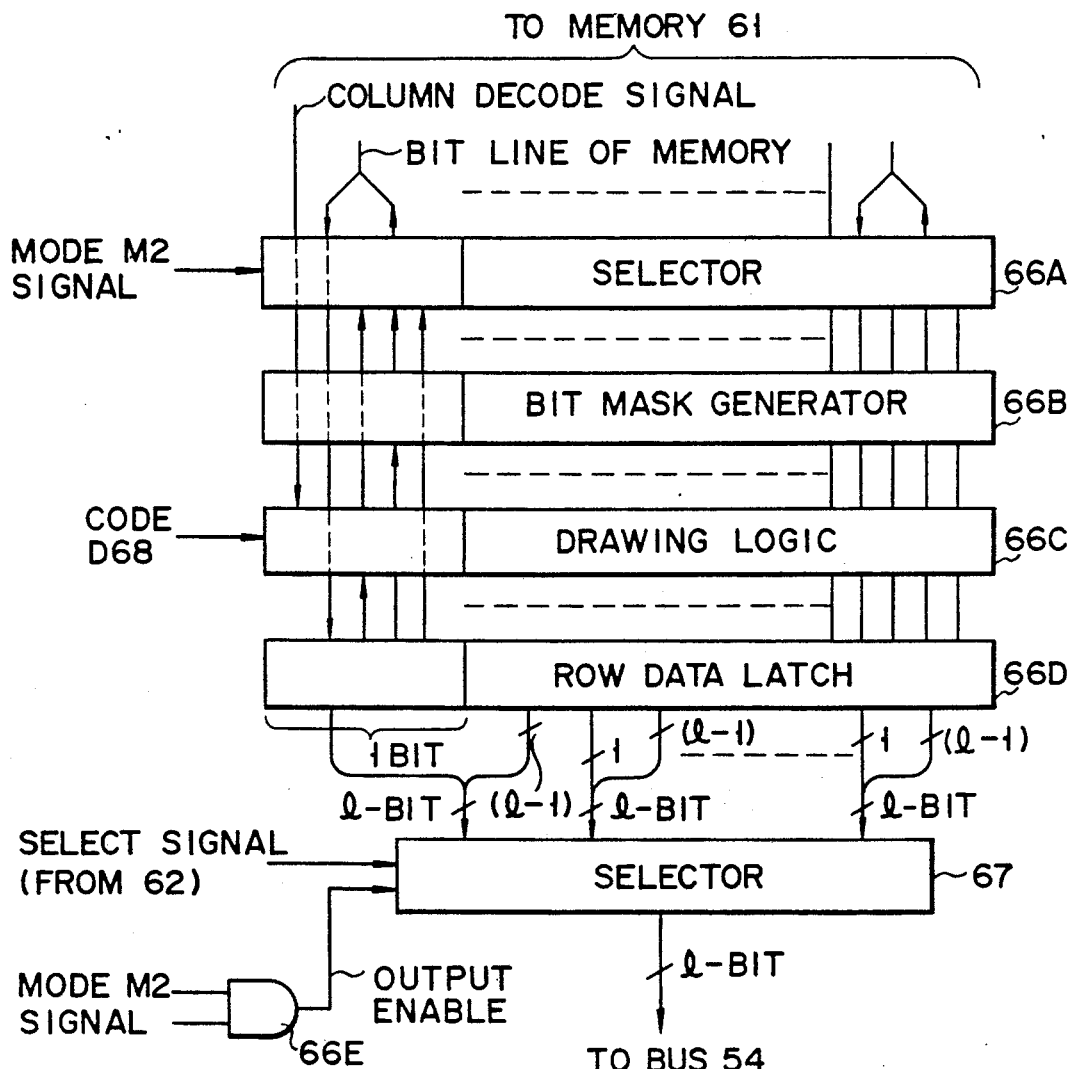
F I G. 13

PATTERN DATA GENERATING SYSTEM

BACKGROUND OF THE INVENTION

1. Field of the Invention

The present invention relates to a pattern data generating system for generating pattern data in which an arbitrary closed graphic pattern whose boundary data is defined on a two-dimensional bit map is filled or painted.

2. Description of the Prior Art

In the field of graphics, it is often required to form pattern data by filling or painting an area defined by an polygonal boundary. It is also required to sequentially generate points, one by one, for forming an arbitrary curve and to fill or paint a portion surrounded by the curve, using hardware such as a DDA (digital differential analyzer). In a conventional system, in order to satisfy such requirements, filling or painting is performed by a scan conversion for polygons. According to the scan conversion, one direction on a two-dimensional bit map is selected. The selected direction is called a scan direction. A line parallel to the scan direction is called a scan line. When filling or painting is to be performed, the coordinates of both ends of a line, included in a closed graphic pattern, are obtained for each scan line, and all lines in the pattern are filled or painted, thereby painting the overall graphic pattern.

A conventional filling/painting operation of a polygon using the scan conversion will be described with reference to FIGS. 10 and 11A to 11C. Referring to FIG. 10, reference numeral 71 denotes a rectangular area to be scan-converted; 72 to 77, vertexes of the boundaries of a polygon; 78 to 83, sides of the polygon; and 91, one scan line.

Procedure (1): Intersection points P0, P1, P2, and P3 of one scan line 91 and sides of the polygon are obtained. Then, the intersection points are sorted in the order of the coordinate values in the scan direction.

Procedure (2): If a given intersection point is an end of a side, i.e., a vertex of the polygon, the give intersection point is processed in accordance with a connection state of the sides of the polygon. In the case shown in FIG. 11A, for example, vertex A is processed as a normal intersection point. In the case shown in FIG. 11B, one of vertexes B and C is processed as an intersection point. In the case shown in FIG. 11C, vertex D is processed as two intersection points.

Procedure (3): The sorted intersection points are paired, and lines having these pairs as their both ends (lines 84 and 85 in FIG. 10) are filled or painted.

Accordingly, in the conventional system, since software processing, such as sorting, takes a considerably long period of time, high-speed filling/painting cannot be performed. Further, it is practically difficult to achieve the function of the software processing by a hardware system.

In addition, when lines are to be filled or painted, vertexes require special processing, as described in procedure (2). Moreover, even if a change in each point of a curve defining an area is generated in a software manner by using a processor or in a hardware manner by using a DDA or the like, the change in each point need be processed as one line in scan conversion. As a result, a large amount of data must be processed.

As described above, in the conventional system, when painting of a closed graphic pattern is performed, various drawbacks are posed, e.g., high-speed processing cannot be performed, and a hardware system is difficult to arrange.

SUMMARY OF THE INVENTION

The present invention has been made in consideration of the above situation, and has as its object to provide a pattern data generating system which can perform painting at high speed and can be easily formed into a hardware system.

In order to achieve the above object, according to the present invention, there is provided a pattern data generating system including a processor (12) for writing in a bit map memory, on the basis of input data, points of all lines to be filled or painted along a scan direction which is one direction on the bit map memory. This writing is performed such that a point on each line is written as one of two end points of the line while a second point, offset by one point in the scan direction, is written as the other of the two end points of the line. The pattern data generating system also includes a pattern data generating circuit (30) for, if w (w is a positive integer) points b0, b1, . . . , b(w−2), and b(w−1) are present on one scan line, writing EXOR of data of points b0, b1, . . . , b(j−1) at positions corresponding to points b(j) (j is not less than 0 and less than w). Similar EXOR data writing is performed by the pattern data generating circuit for all the scan lines, thereby generating pattern data in which the area surrounded by the closed curve is filled or painted.

In the pattern data generating system according to the present invention, a special memory circuit is used to fill or paint the area surrounded by the closed curve. The special memory circuit is arranged such that row and column directions thereof respectively correspond to x and y directions of the bit map, and exclusive OR data of the points b0, b1, . . . , b(j−1) to be written in each point b(j) is calculated for each row, using a hardware logic.

According to the pattern data generating system of the present invention, boundary data has a direction defined as a clockwise or counterclockwise direction with respect to an area to be painted. This data is given as the coordinates of a start point of a closed curved and changes dx and dy of each point. In this case, each of changes dx and dy takes any one of +1, −1, and 0.

In order to generate painted pattern data from such data, a special memory or a rectangular area of a memory is used, and points corresponding to the boundary of a closed curve are generated from data dx and dy and are written in the memory. In this case, the points corresponding to the boundary are not those on the boundary. That is, while a point on a line to be filled or painted is given as one of the end points of the line, a point offset by one point in a scan direction is given as the other end point.

After the points representing the boundary are written in the memory as described above, data are written in the points along the scan line, thereby obtaining painted pattern data. At this time, if one scan line includes, e.g., w bits and bit data at the respective points on the scan line are given as d0, d1, . . . , d(w−1), the following exclusive OR calculations are sequentially performed. The exclusive OR results are written in the memory to obtain painted pattern data d0', d1', . . . , d(w−1)':

$$\left.\begin{array}{l} d0' \ominus d0 \\ d1' \ominus d0' \oplus d1 \\ \cdots \\ d(w-1)' \ominus d(w-2)' \oplus d(w-2) \end{array}\right\} \quad (1)$$

BRIEF DESCRIPTION OF THE DRAWINGS

FIG. 2 is a block diagram showing a hardware configuration of the pattern data generating system of the above first embodiment;

FIG. 4A-4C illustrate the manner of obtaining fill-/paint data from the contour data, using an EXOR operation;

FIG. 5 is a modification of the flow chart shown in FIG. 1;

FIGS. 6A-6C illustrate how the contours of another pattern to be filled or painted are stored in a bit map memory;

FIG. 7 is a block diagram showing a hardware configuration of the pattern data generating system according to a second embodiment;

FIG. 8 is a block diagram showing details of part of the hardware in FIG. 7;

FIG. 10 shows a pattern for explaining a conventional filling/painting operation;

FIG. 11 shows figures used to explain the conventional filling/painting operation.

FIG. 12A-12B explain the timing of generating mode signals (M1, M2) used in the hardware of FIG. 8; and FIG. 13 is a block diagram showing the inner circuit configuration of the row data buffer (66) shown in FIG. 8.

DETAILED DESCRIPTION OF THE PREFERRED EMBODIMENTS

Figure 1:
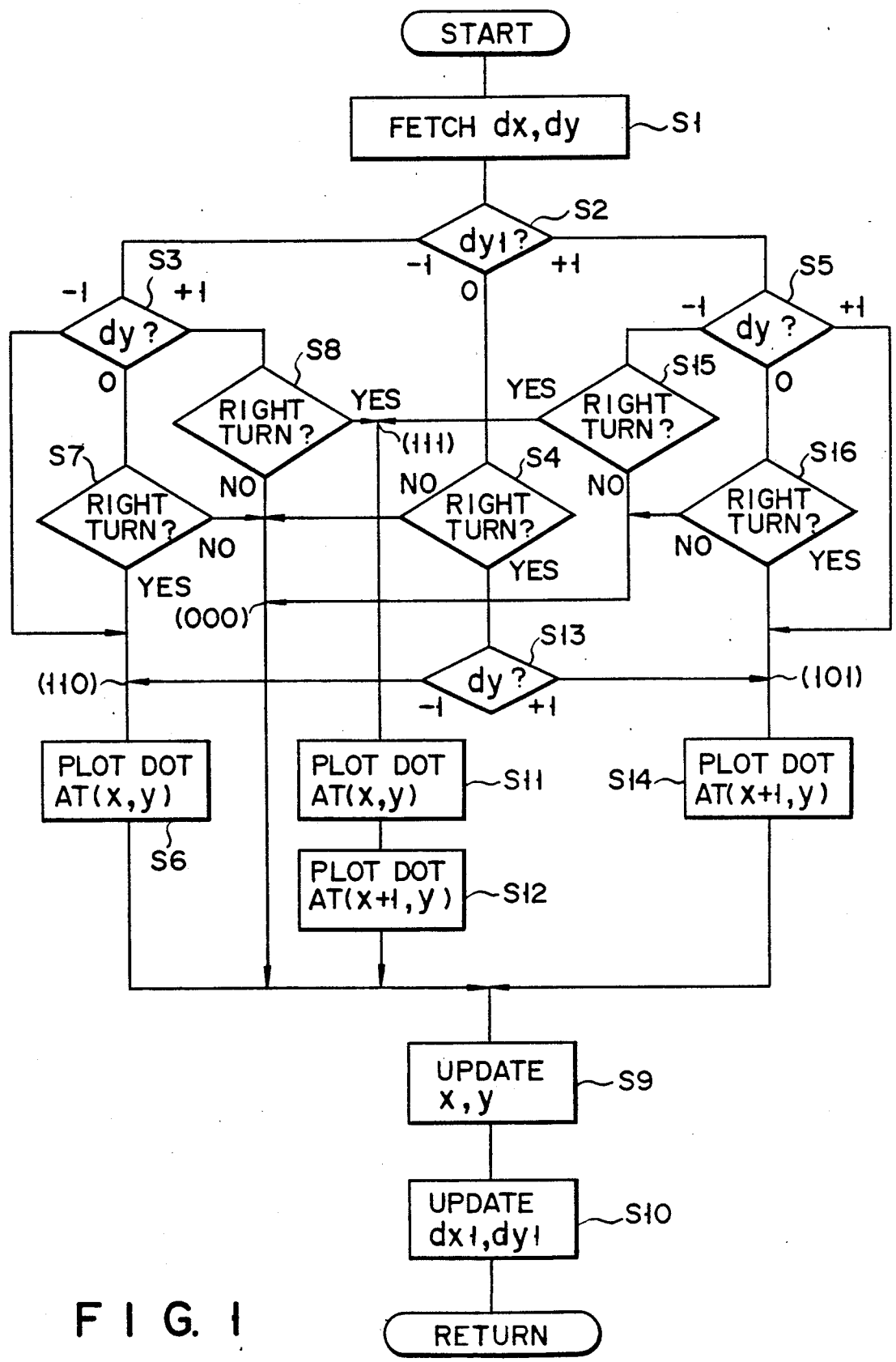
FIG. 1 is a flow chart explaining the operation of a pattern data generating system according to a first embodiment of the present invention.

Embodiments of the present invention will be described below with reference to the accompanying drawings.

FIG. 2 is a block diagram showing an arrangement of hardware used to realize a first embodiment of the present invention. Referring to FIG. 2, reference numeral 11 denotes an input unit comprising, e.g., a host computer; 12, a processor; 13, a memory; and 14, a display unit such as a CRT. These units are connected with each other through a bus 15.

In order to output a boundary of an area to be painted, input unit 11 sequentially outputs x- and y-coordinates at a start point and coordinate changes dx and dy at each point as data of a closed curve having a defined clockwise or counterclockwise direction. Each change dx and dy is either +1, -1, or 0.

On the basis of data dx and dy, processor 12 writes points of all the lines to be painted along a scan direction in a rectangular area (to be referred to as simply a memory hereinafter) of a two-dimensional bit map arranged in memory 13. In this case, a point on each line is written as one of the two end points of the line in the memory, while a point offset by one point in the scan direction is written as the other end point of the line.

Alternatively, in place of input unit 11, processor 12 may output coordinate changes dx and dy.

Processor 12 then performs calculations using data points b0', b1', ..., b(w-2)', and b(w-1)' on one scan line written in the memory beforehand and writes calculated data in this memory or in a memory other than memory 13.

The calculated data written in the memory is supplied as pattern data to display unit 14, and a pattern in which an area of the closed curve is painted is displayed.

Pattern data is generated by using the above hardware in the following order.

<1> All the data in the memory is cleared to "0".

<2> One of the vertexes of a polygon is selected as a start point.

<3> Points on the sides of the polygon are sequentially output clockwise from input unit 11, and differences (dx1,dy1) from the preceding points and differences (dx,dy) to the next points are sequentially output.

Processor 12 sequentially outputs points representing a boundary in accordance with an algorithm shown in a flowchart of FIG. 1, and the generated points are written in the memory. When the points representing the boundary are to be written in the memory, an exclusive OR result of data d(x,y) of one bit of the memory corresponding to coordinates (x,y) and "1" is written. That is, the following relation is obtained:

$$d(x,y) \ominus d(x,y) \oplus \text{"1"} \quad \ldots (2)$$

<4> Assume that changes dx0 and dy0 from the start point to the next point are stored, changes throughout the sides of the polygon are similarly stored, and then the operation returns to the start point. In this case, processing shown in FIG. 1 is performed assuming that final changes are dx1 and dy1 and those from the start to next point are dx and dy. As a result, a point representing the boundary with respect to the start point is generated and written in the memory.

<5> Assuming that one scan line includes x bits and bit data on the scan line is given as d0, d1, ..., d(w-1), new data d0', d1', ..., d(w-1)' is generated by the following calculations and written as pattern data in the memory:

$$\left.\begin{array}{l} d0' \ominus d0 \\ d1' \ominus d0' \oplus d1 \\ \cdots \\ d(w-1)' \ominus d(w-2)' \oplus d(w-1) \end{array}\right\} \quad (3)$$

In the flowchart shown in FIG. 1. dx and dy are given in step S1 (to be referred to as simply S hereinafter). In S2, the value of dy1 is checked. If the value is -1, the flow advances to S3; if 0, the flow advances to S4; and if +1, the flow advances to S5.

In S3, the value of dy is checked. If the value is -1, the flow advances to S6; if 0, the flow advances to S7; and if +1, the flow advances to S8. In S6, a dot is plotted at point (x,y). Thereafter, point (x,y) is updated in S9, point (dx1,dy1) is updated in S10, and then the flow returns to S1.

Figure 3A:
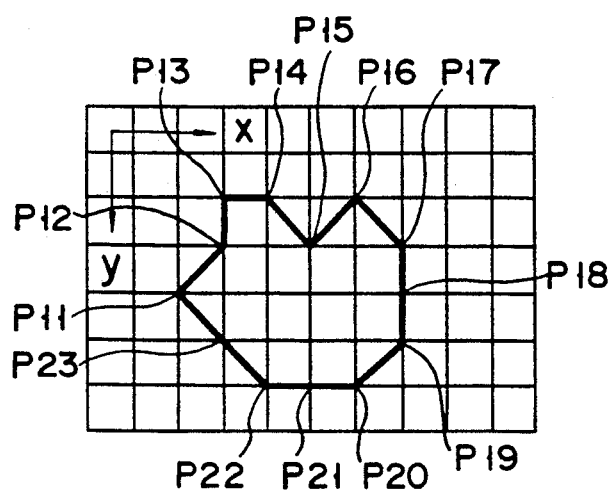
FIGS. 3A-3F illustrate how the contours of a pattern to be filled or painted are stored in a bit map memory.

In S7 and S8, whether a right turn or clockwise succession is to be made is checked. In this case, the right turn or clockwise succession means that a vector of (dx,dy) is bent to the right with respect to a vector of (dx1,dy1). For example, assume that a coordinate system in which a right direction is a positive direction of x and a downward direction is a positive direction of y as shown in FIG. 3A is used. In this case, when the value of t given by the following equation is larger than 0 (t>0), a right turn is to be made; when it is smaller than 0 (t<0), a left turn is to be made; and when it equals 0 (t=0), forward or backward movement is to be made:

$$t = dx1 \cdot dy - dy1 \cdot dx \qquad \ldots (4)$$

If no right turn is determined in any of S7 and S8, no dot is plotted at that point, and the flow advances to S9. If a right turn is determined in S7, a dot is plotted at point (x,y) in S6, and then the flow advances to S9. If a right turn is determined in S8, a dot is plotted at point (x,y) in S11, a dot is plotted at point (x+1,y) in S12, and then the flow advances to S9.

In S4, whether a right turn is to be made is checked. If no right turn is determined in S4, no dot is plotted as described above. If a right turn is determined in S4, the flow advances to S13. In S13, the value of dy is checked. If the value is −1, a dot is plotted at point (x,y); and if +1, a dot is plotted at point (x+1,y). The flow then advances to S9.

In S5, the value of dy is checked. If the value is −1, the flow advances to S15; if 0, it advances to S16; and if +1, it advances to S14 and a dot is plotted at point (x+1,y). In S15 and S16, whether a right turn is to be made is checked. If no right turn is determined in any of S15 and S16, no dot is plotted, and the flow advances to S9. If a right turn is determined in S15, a dot is plotted at point (x,y) in S11, and a dot is plotted at point (x+1,y) in S12. If a right turn is determined in S16, the flow advances to S14 and a dot is plotted at point (x+1,y).

An operation of filling or painting a polygon having the closed curve as shown in FIG. 3A as its boundary in accordance with the above sequence will be described below. Assume that vertex p11 of the closed curve shown in FIG. 3A is selected as a start point.

Figure 3B:
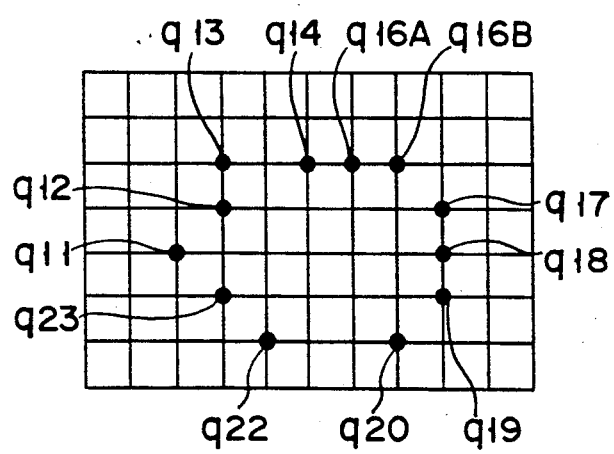

No data is written in point q11 stored in the memory shown in FIG. 3B and corresponding to point p11, i.e., point q11 is kept "0".

Differences (dx,dy)=(0,−1) of next point p13 with respect to point p12 of the polygon are given. At this time, differences from preceding point p12 are given as (dx1,dy1)=(+1,−1). Since dy1 is −1 and dy=−1, "1" as an exclusive OR result between "−1" and "1" is written in coordinates (x,y), i.e., point q12 stored in the memory shown in FIG. 3B and corresponding to point p12.

Differences (dx,dy)=(+1,0) of next point p14 with respect to point p13 are given. In this case, updated dy1=−1 and dy=0, and a right turn is to be made. In S6, therefore, "1" is written in coordinates (x,y), i.e., point q13 stored in the memory shown in FIG. 3B and corresponding to point p13.

Differences (dx,dy)=(+1,+1) of next point p15 with respect to point p14 are given. In this case. dy1=0 and a right turn is to be made, and dy=+1. In S14, therefore, "1" is written in coordinates (x+1,y), i.e., point q14 stored in the memory shown in FIG. 3B is offset by one point to the right with respect to point p14.

Differences (dx,dy)=(+1,−1) of next point p16 with respect to point p15 are given. In this case, dy1=+1, dy=−1, and no right turn is to be made. Therefore, no dot is plotted at point p15.

Differences (dx,dy)=(+1,+1) of next point p17 with respect to point p16 are given. In this case, dy1=−1, dy=+1, and a right turn is to be made. In S11, therefore, "1" is written in coordinates (x,y), i.e., point q16A stored in the memory shown in FIG. 3B corresponds to point p16. Then in S12, "1" is written in coordinates (x+1,y), i.e., point q16B stored in the memory shown in FIG. 3B is offset by one point to the right with respect to point p16.

Differences (dx,dy)=(0,+1) of next point p18 with respect to point p17 are given. In this case, dy1=+1 and dy=+1. In S14, therefore, "1" is written in coordinates (x+1,y), i.e., point q17 stored in the memory shown in FIG. 3B is offset by one point to the right with respect to point p17. Similarly, "1"s are written in points q18 and q19 stored in the memory shown in FIG. 3B offset by one point each to the right with respect to points p18 and p19, respectively.

Differences (dx,dy)=(−1,0) of next point p21 with respect to point p20 are given. In this case, dy1=+1, dy=0, and a right turn is to be made. In S14, therefore, "1" is written in coordinates (x+1,y), i.e., point q20 stored in the memory shown in FIG. 3B is offset by one point to the right with respect to point p20.

Differences (dx,dy)=(−1,0) of point p22 with respect to point p21 are given. In this case, dy1=0, dy=0, and movement to be made is not a right turn but a horizontal movement. Therefore, no dot is plotted at point p21.

Differences (dx,dy)=(−1,−1) of next point p23 with respect to point p22 are given. In this case, dy1=0 dy=−1 and there is a right turn. In S6, therefore, "1" is written in coordinates (x,y), i.e., point q22 stored in the memory shown in FIG. 3B and corresponding to point p22.

Differences (dx,dy)=(−1,−1) of the next point (start point p11) with respect to point p23 are given. In this case, similar to the case of point p22, "1" is written in point q23 stored in the memory shown in FIG. 3B and corresponding to point p23.

In this manner, the operation returns to start point p11. In this case, since final changes (dx1,dx1) are (−1,−1) and initial changes (dx,dy) are (+1,−1), dy1=−1 and dy=−1 are obtained. In S6, therefore. "1" is written in coordinates (x,y), i.e., point q11 stored in the memory shown in FIG. 3B corresponds to start point p11 for the first time.

In this manner, for all the lines to be filled or painted along the scan direction, a point on each line is written as one of its two end points in the memory, while a point offset by one point in the scan direction is written as the other. Thereafter, calculations are performed in accordance with the sequence of process <5> using the data as shown in FIG. 3B, and calculation results are written in the memory.

Figure 3C:
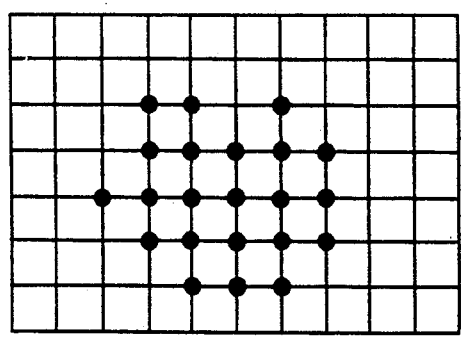

The above calculation can be performed by a hardware, or EXOR's 30−0 to 30−(w−1), as is shown in FIG. 4C. If one scan line includes w bits of b0, b1, ... , b(w−1) as shown in FIG. 4A, "0" as b0 in FIG. 4A is directly written in b0' after calculation. An exclusive OR result between b0 and b1 shown in FIG. 4A is written in b1' after calculation. In this case, since b0=b1="0", "0" is written in b1' after calculation. An exclusive OR result between b0, b1, and b2 shown in FIG. 4A is written in b2 after calculation. In this case, since b0=b1="0" and b2="1", "1" is written in b2' after calculation. Similar calculations are sequentially performed to obtain data as shown in FIG. 4B. As a result of calculations of all the scan lines shown in FIG. 3B, pattern data shown in FIG. 3C is obtained with respect to the input graphic pattern shown in FIG. 3A. Using this pattern data, a graphic pattern, in which the area of polygons having the closed curve shown in FIG. 3A as a boundary is filled or painted, can be accurately displayed.

Incidentally, when a bit mask generator disclosed in Japanese Patent Application No. 63-20316, the inventors of which are the same as those of the present invention, is used to execute equation (3), the EXOR calculation speed can be further increased.

According to the embodiment as described above, pattern data in which an area is surrounded by a closed curved can be generated. In addition, according to the above embodiment, unlike a conventional system, sorting need not be performed to realize high-speed processing.

Figure 3D:
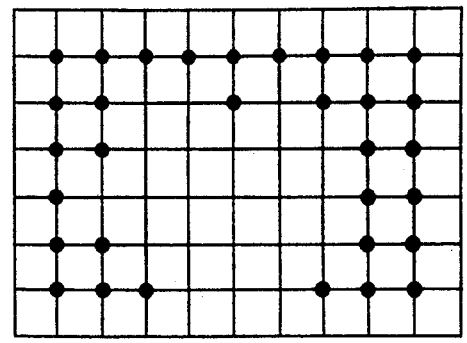

A modification of the above embodiment will be described below. In the above description, pattern data in which an area is surrounded by a closed curve is generated. However, pattern data in which a portion outside the above area is painted as shown in FIG. 3D can be generated. In this case, in place of the calculation of equation (3), the following calculation may be executed to the data shown in FIG. 3B for each scan line.

$$\left. \begin{array}{l} d0' = d0 \oplus \text{``1''} \\ d1' = d0' \oplus d1 \\ \ldots \\ d(w-1)' = d(w-2)' \oplus d(w-1) \end{array} \right\} \quad (5)$$

In the above description, the closed curve is generated clockwise. In this modification, however, an algorithm shown in a flowchart of FIG. 5 in place of that shown in FIG. 1 may be used to process each point generated counterclockwise.

Figure 3E:
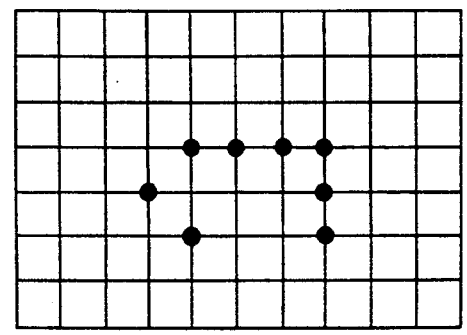
Figure 3F:
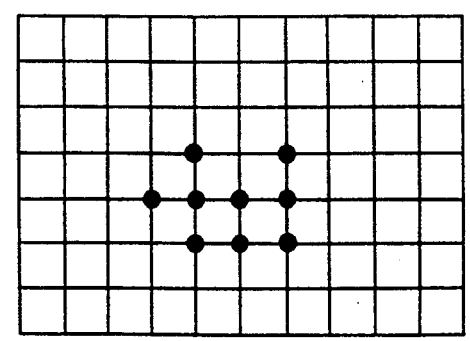

In addition, in the above description, the area surrounded by the closed curve is filled or painted together with the boundary. The boundary, however, need not be included to perform filling or painting. In this case, the algorithm as shown in the flowchart of FIG. 5 may be used to process each point for a clockwise boundary, and that shown in the flowchart of FIG. 1 may be used to process each point for a counterclockwise boundary. As a result, data as shown in FIG. 3E is obtained from the boundary data as shown in FIG. 3A. When the calculation of equation (3) is executed to the data shown in FIG. 3E in units of scan lines, pattern data as shown in FIG. 3F is obtained.

According to the above embodiment, filling or painting can be correctly performed to even boundary data as shown in FIG. 6A. That is, in this case, one scan line 21 shown in FIG. 6A has a boundary and four intersection points 22 to 25. Since two intersection points 23 and 24 are adjacent along a scan line, only a line connecting intersection points 22 and 25 may be painted. In this case, points 32, 33, and 34 are written as intersection points 22 to 25 as shown in FIG. 6B in accordance with procedure <3>. At this time, since point 33 is written twice, it becomes "0". Therefore, "1"s are written in two points 32 and 34 on scan line 21. As a result, correct pattern data in which an area including a boundary is filled or painted as shown in FIG. 6C is finally obtained.

FIG. 7 is a block diagram showing an arrangement of hardware used to realize a second embodiment of the present invention. In the second embodiment pattern data as described above is generated using exclusive hardware. This hardware comprises DDA unit 51, memory unit 52, control unit (CPU) 53, and bus 54 for connecting these units.

DDA unit 51 has a DDA function and generates dx and dy signals. The dx and dy signals include two bits of DX0 and DX0, and DY0 and DY0, respectively. The dx signal is coded as shown in table 1 below. The dy signal is similarly coded as shown in table 2.

TABLE 1

| DX0 | DX0 | dx |
|---|---|---|
| 0 | 0 | 0 |
| 0 | 1 | 0 |
| 1 | 0 | +1 |
| 1 | 1 | −1 |

TABLE 2

| DY0 | DY0 | dy |
|---|---|---|
| 0 | 0 | 0 |
| 0 | 1 | 0 |
| 1 | 0 | +1 |
| 1 | 1 | −1 |

Memory unit 52 is arranged as shown in a block diagram of FIG. 8. Referring to FIG. 8, reference numeral 61 denotes an n x m-bit memory cell array in which row and column directions correspond to x and y directions of a bit map, respectively; 62, an x counter comprising an up/down counter capable of holding and presetting an x-coordinate value; 63, a y counter comprising an up/down counter capable of holding and presetting a y-coordinate value; 64, a column decoder for decoding the contents in x counter 62 and generating a column selection signal; 65, a row decoder for decoding the contents in y counter 63 and generating a row selection signal; 66, a row data buffer for holding data of one row (w bits) and having a calculation function to be described below; 67, a selector for dividing the w-bit data, held by row data buffer 66, into k l-bits (l×k=w), selecting one l-bit data in accordance with part of a column address signal, and connecting the selected data to bus 54; and 68, a code generator for receiving the dx and dy signals and generating a 3-bit code for controlling the function of row data buffer 66.

X counter 62 is preset by the value on bus 54 when 1-bit mode signal M1 is "0" (preset mode), and increments or decrements its contents on the basis of the dx signal when mode signal M1 is "1" (dx-dy input mode). Similarly, y counter 63 is preset by the value on bus 54 when mode signal M1 is "0", and increments or decrements its contents on the basis of the dy signal when mode signal M1 is "1".

Buffer 66 has a calculation function and selectively performs the following four operations in accordance with 2-bit mode signal M2 (see FIG. 12A).

[1] "0"s are written in one row selected by the row selection signal which is obtained from x counter 62 (M2=00).

[2] The following operations are performed in accordance with a 3-bit code generated by code generator 68 (M2=01).

1) If the code is (0XX) and (100) (X is 0 or 1), nothing is performed.

2) If the code is (110), only a bit stored in the buffer and selected by the column selection signal is inverted and written in a row selected by the row selection signal.

3) If the code is (101), only a bit adjacent to a bit stored in the buffer and selected by the column selection signal in a direction of incrementing a column address is inverted and written in a row selected by the row selection signal.

4) If the code is (111), a bit stored in the buffer and selected by the column selection signal and a bit adjacent to the selected bit in a direction of incrementing a column address are inverted and written in a row selected by the row selection signal.

[3] Data in the buffer is supplied to a bit mask generating circuit (not shown) for performing calculations given by equation (3), and a generated bit mask (e.g., the data as shown in FIG. 3C) is written in a row selected by the row selection signal (M2=10).

[4] Data of one row selected by the row selection signal is fetched in the buffer and output to bus 54 through selector 67 (M2=11).

Figure 9:
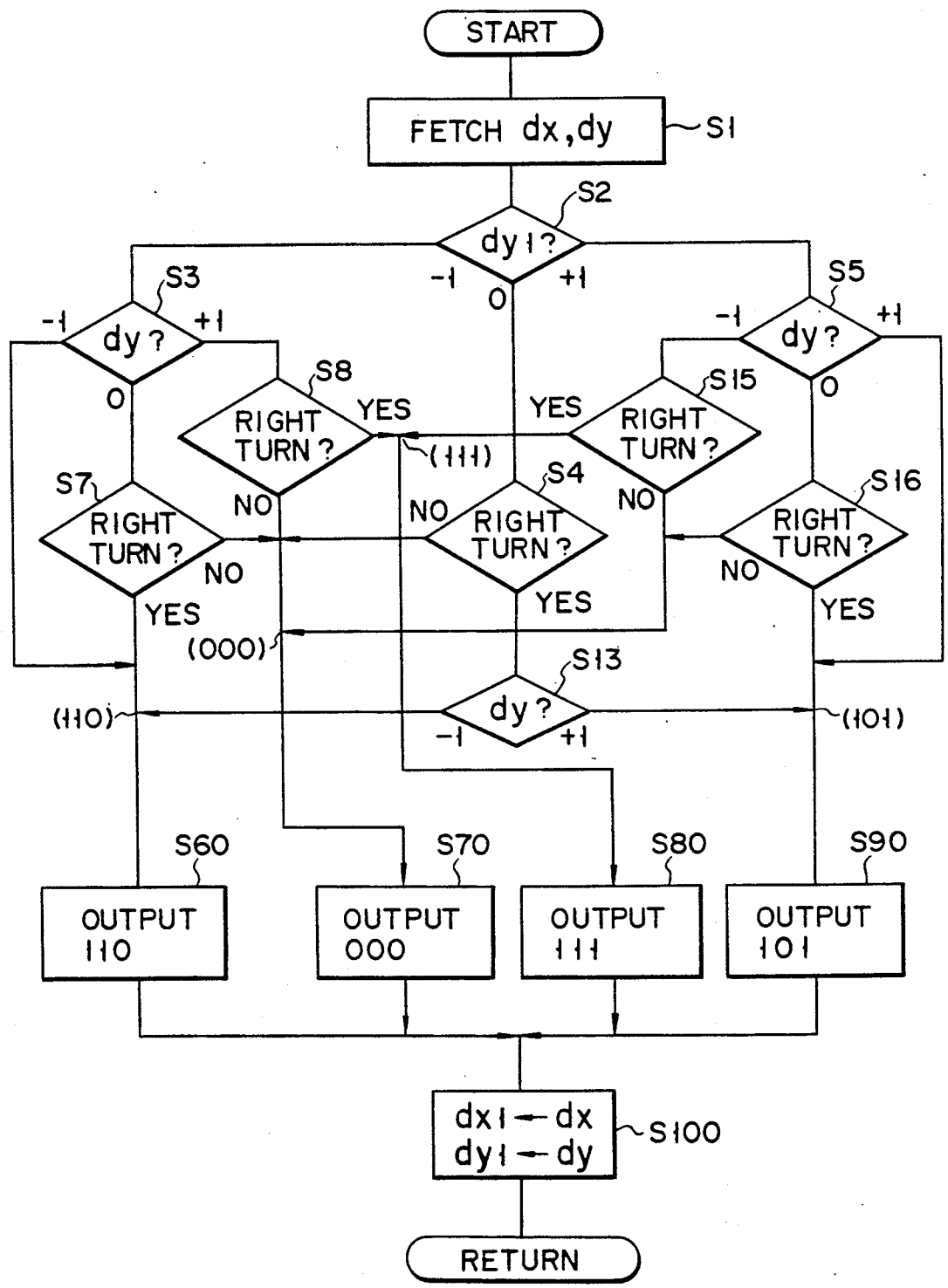
FIG. 9 is a flow chart explaining the operation of the pattern data generating system of the above second embodiment.

Code generator 68 includes a register for storing dx1 and dy1 which are immediately preceding dx and dy, respectively, and generates 3-bit code D68 in response to inputs dx and dy in accordance with an algorithm as shown in a flowchart of FIG. 9.

An example of the relation among dx, dy, dx1, and dy1 is shown in table 3 below:

TABLE 3

| dY1 | dY | dX1 | dX | CODE D68 |
|---|---|---|---|---|
| −1 | −1 | — | — | 110 |
|  | 0 | — | +1 | 110 |
|  |  | — | −1 | 000 |
|  | +1 | +1 | +1 | 111 |
|  |  |  | 0 | 111 |
|  |  |  | −1 | 000 |
|  |  | 0 | +1 | 111 |
|  |  |  | 0 | 000 |
|  |  |  | −1 | 000 |
|  |  | −1 | — | 000 |
| 0 | +1 | +1 | — | 101 |
|  |  | −1 | — | 000 |
|  | 0 | — | — | 000 |
|  | −1 | +1 | — | 000 |
|  |  | −1 | — | 110 |
| +1 | −1 | +1 | — | 000 |
|  |  | 0 | +1 | 000 |
|  |  |  | 0 | 000 |
|  |  |  | −1 | 111 |
|  |  | −1 | +1 | 000 |
|  |  |  | 0 | 111 |
|  |  |  | −1 | 111 |
|  | 0 | — | +1 | 000 |
|  |  | — | −1 | 101 |
|  | +1 | — | — | 101 |

Memory unit 52 shown in detail in FIG. 8 has the following five functions.

(i) All the memory cells are cleared to be "0"s (M2=00).

(ii) X- and y-coordinates are externally input through bus 54 and set as preset data in x and y counters 62 and 63, respectively (M2=01).

(iii) The dx and dy signals are externally input through bus 54 to increment o decrement the contents in x and y counters 62 and 63, respectively, and the following processing is performed in correspondence with a code generated in accordance with the algorithm of the flowchart shown in FIG. 9 together with dx1 and dy1 (this is called a DDA mode; M2=01).

1) If the code is (110), the content in a memory cell at point (x,y) is inverted.

2) If the code is (101), the content in a memory cell at point (x+1,y) is inverted.

3) If the code is (110), the contents in memory cells at points (x,y) and (x+1,y) are inverted.

(iv) Row data of all the rows are sequentially input to the bit mask generator, and obtained outputs are written (this is called a filling or painting mode; M2=10).

(v) The contents in memory cell array 61 are read out in units of k bits (this is called a read mode; M2=11).

Control unit 53 sets various parameters in DDA unit 51 through bus 54 to activate DDA unit 51 and outputs mode signals M1 and M2 (FIGS. 12A and 12B) to memory unit 52 to control it.

Filling or painting using the above hardware is performed as follows.

(a) A closed curve is divided into partial curves or straight lines.

(b) Parameters are set in DDA unit 51 to activate it (M2=00 in FIG. 12A).

(c) DDA unit 51 generates dx and dy (FIG. 12B).

(d) Data about a boundary is written in memory unit 52 in accordance with dx and dy (M2=01 in FIG. 12A).

(e) Procedures (b) to (d) are repeated the number of times corresponding to the number of partial curves. This process can be executed at high speed by a pipe line operation technique.

(f) Memory unit 52 is operated in the filling or painting mode, and pattern data is written in memory unit 52 (M2=10 in FIG. 12A).

(g) In the read mode, the written pattern data is read out from memory unit 52 (M2=11 in FIG. 12A).

In this manner, according to this embodiment, the special hardware is used to obtain filled or painted pattern data.

In the above embodiment, assuming that an operation period of DDA unit 51 is T0; the number of points on a boundary is N; and a time required for filling or painting one scan line in memory unit 52 in the filling/painting mode is T1, time Tp required for the filling/painting processing is given by the following equation:

$$Tp = T0 + N \cdot T1 \qquad \ldots (6)$$

As is apparent from this embodiment, the system according to the present invention can be easily formed into an exclusive hardware system, and filling or painting can be performed at high speed.

According to the present invention as has been described above, sorting need not be performed unlike in a conventional system. When processing is performed in a software manner, therefore, a load on software processing can be reduced to increase a processing speed. In addition, since sorting is unnecessary, an exclusive hardware arrangement can be easily realized to enable high-speed processing.

Furthermore, according to the present invention, by offsetting one of the end points of a line to be filled or painted from an actual coordinate point, filling or painting of lines can be easily performed. Also, since special software processing for vertexes performed in a conventional system is not required, high-speed filling-/painting can be performed.

incidentally, details of DDA unit 51 in FIG. 7 are substantially disclosed in the following literature: W.M.

Newman, and R.F. Sproul, "Principle of Interactive Computer Graphics", pp. 20-28, McGraw-Hill, 1979 All disclosures of the above-identified literature are incorporated in the present specification. When the DDA unit disclosed in the above literature is applied to the present invention, the aforementioned algorithm, identified by items (i) to (v) in the present specification, may be replaced by the following algorithm:

(Note: all variables are integers)

```
dx := + 1;

e := 2 * deltay − deltax;

for i := 1 to deltax do begin if e > 0 then begin dy = +1;

d := e + (2 * deltay − 2 * deltax end else begin dy = 0;
        e := + 2* deltay;

end end

Output (dx,dy);

end;
```

FIG. 13 shows an internal circuit configuration of the row data buffer in FIG. 8. The w-bit (=k×l bits) signal lines of row data from memory cell array 61 are connected to selector 66A. Selector 66A receives 2-bit mode signal M2 which can have four states (00; 01; 10; 11), as is shown in FIG. 12A, in response to the mode of the circuit operation of FIG. 8. Thus, the signal selection state of selector 66A is determined by mode signal M2.

The row data selected by selector 66A is input to bit mask generator 66B. Generator 66B is provided with a hardware logic formed of EXOR gate array.

The bit mask pattern obtained from bit mask generator 66B is input to drawing logic 66C. Logic 66C is responsive to the contents of code D68 (cf. table 3) generated by code generator 68. In response to code D68, generator 68 generates filling/painting pattern data in which bits of input bit mask pattern (or the column decode signal representing the x position) to be inverted have been inverted.

The filling/painting pattern data for one row delivered from drawing logic 66C is temporarily stored or latched by row data latch 66D. The latched filling/painting pattern data of k×l bits is input to selector 67. Selector 67 selects the l-bit filling/painting pattern data designated by a selection signal from x counter 62 in FIG. 8. When an output enable signal becomes logic "1", selector 67 sends the selected l-bit filling/painting pattern data to bus 54. Filling/ painting pattern data in unit of l-bit can thus be obtained in high speed.

Incidentally, the aforementioned output enable signal is obtained from AND gate 66E which produces the logical product of 2-bit mode signal M2 (FIG. 12A). More specifically, when two bits of mode signal M2 are both logic "1", or M2="1,1", then the output enable signal becomes logic "1" so that the selected l-bit data is sent to bus 54.

Note that there are following Japanese Patent Applications which can be used with the present invention:

(1) Japanese Patent Application No. 63-20314, filed on Jan. 30, 1988; and (2) Japanese Patent Application No. 63-20316, filed on Jan. 30, 1988.

The inventors of the present invention are identical to the inventors of the above Japanese Patent Applications, and new patent applications corresponding to these Japanese Patent Applications will also be filed at U.S. Patent Office. All disclosures of the above Japanese Patent Applications and the corresponding U.S. patent applications are now incorporated in the specification of the present invention.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A pattern data generating system for generating pattern data used to fill a region encircled by a closed curve on a bit map, said bit map being defined on an x-y plane on which a scan line is presented, said pattern data generating system comprising:

a bit map memory for storing data of the bit map;

means for generating data dx and dy representing a change in position on the x-y plane between a given point of the closed curve and a succeeding point, being adjacent to said given point, on the closed curve;

means, being responsive to said data dx and dy, for writing into said bit map memory a first position data of one end of a line component formed on said scan line to be filled, and for writing into said bit map memory a second position data which is shifted by one dot of the bit map outside the other end of said line component; and means for detecting logical EXOR b0', b1'. . . b(w−2)' from data of points b0, b1, . . . , b(j−1), and writing data of said EXOR b0', b1', . . . , b(w−2)' into said bit map memory at locations respectively corresponding to said points b0, b1, . . . , b(j−1), wherein parameters w and j are integers provided that 0≦ j<w, and said scan line contains w points b0, b1, . . . , b(w−1).

2. A pattern data generating system according to claim 1, wherein the change in position from said given point toward said succeeding point is succeeded clockwise along said closed curve, and each said data dx and dy has a value selected from the values +1, −1, and 0.

3. A pattern data generating system according to claim 2, wherein said means for writing includes a computer, comprising:

means for detecting said data dx and dy which show a change in position on the x−y plane from the given point to the succeeding point being adjacent to the given point and being located on said closed curve, and for detecting data dx1 and dy1 which show a change in position on the x−y plane from the given point to a preceding point adjacent to the given point and being located on said closed curve;

first means for checking the value of said data dy1 detected by said means for detecting;

second means for checking the value of said data dy detected by said means for detecting when said first means for checking indicates said data dy1=−1;

third means for checking whether the change in position from said given point toward said succeeding point is succeeded clockwise, when said first means for checking indicates said data dy1=0;

fourth means for checking the value of said data dy when said first means for checking indicates said data dy1 = +1;

first means for plotting a dot on a position on said x-y plane when said second means for checking indicates said data dy=−1;

fifth means for checking whether the change in position from said given point toward said succeeding point is succeeded clockwise, when said second means for checking indicates said data dy=0; wherein if the position change is succeeded clockwise, said first means for plotting plots a dot on a position on said x-y plane;

sixth means for checking whether the change in position from said given point toward said succeeding point is succeeded clockwise, when said second means for checking indicates said data dy=+1;

first means for updating coordinate data x and y of said x-y plane, after said first means for plotting plots a dot on said x-y plane and for updating coordinate data x and y of said x-y plane when any of said third, fifth and sixth means for checking indicates the position change is not succeeded clockwise; and second means for updating said data dx1 and dy1, in conjunction with said first means for updating said coordinate data x and y.

4. A pattern data generating system according to claim 3, wherein said computer further comprises:

second means for plotting a dot on a position on said x-y plane if said sixth means for checking indicates the position change is succeeded clockwise;

third means for plotting a second dot on a position on said x-y plane, in conjunction with said second means for plotting;

seventh means for checking the value of said data dy if said third means for checking indicates the position change is succeeded clockwise; wherein said first means for plotting plots a dot on said x-y plane when said data dy=−1;

fourth means for plotting a dot on a position on said x-y plane, if either of said fourth means for checking and said seventh means for checking indicates that said data dy=+1;

eighth means for checking whether the change in position from said given point toward said succeeding point is succeeded clockwise, when said fourth means for checking indicates said data dy=−1; wherein if the position change is succeeded clockwise, said second means for plotting plots a dot on said x-y plane, and if the position change is not succeeded clockwise, said first means for plotting plots a dot on said x-y plane; and ninth means for checking whether the change in position from said given point toward said succeeding point is succeeded clockwise, when said fourth means for checking indicates said data dy=0; wherein if the position change is succeeded clockwise, said fourth means for plotting plots a dot on said x-y plane, and if the position change is not succeeded clockwise, said first means for plotting plots a dot on said x-y plane.

5. A pattern data generating system according to claim 2, wherein said means for writing includes a computer, comprising:

means for detecting said data dx and dy which show a change in position on the x-y plane from the given point to the succeeding point being adjacent to the given point and being located on said closed curve, and for detecting data dx1 and dy1 which show a change in position on the x-y plane from the given point to a preceding point adjacent to the given point located on said closed curve;

first means for checking the value of said data dy1 detected by said means for detecting;

second means for checking the value of said data dy detected by said means for detecting when said first means for checking indicates data dy1=−1;

third means for checking whether the change in position from said given point toward said succeeding point is succeeded clockwise, when said first means for checking indicates said data dy1=0;

fourth means for checking the value of said data dy when said first means for checking indicates said data dy1 = +1;

first means for outputting data "110" when said second means for checking indicates said data dy=−1;

fifth means for checking whether the change in position from said given point toward said succeeding point is succeeded clockwise, when said second means for checking indicates said data dy=0; wherein if the position change is succeeded clockwise, said first means for outputting outputs data "110";

sixth means for checking whether the change in position from said given point toward said succeeding point is succeeded clockwise, when said second means for checking indicates said data dy=+1;

second means for outputting data "000" if any of said third, fifth and sixth means for checking indicates that the position change is not succeeded clockwise;

third means for outputting data "111" if said sixth means for checking indicates that the position change is succeeded clockwise;

seventh means for checking the value of said data dy if said third means for checking indicates that the position change is succeeded clockwise; wherein the content of said first means for outputting outputs data "110" when said data dy=−1;

fourth means for outputting data "101" if any of said fourth and sixth means for checking indicates that said data dy=+1;

eighth means for checking whether the change in position from said given point toward said succeeding point is succeeded clockwise, when said fourth means for checking indicates that said data dy=−1; wherein if the position change is succeeded clockwise, said third means for outputting outputs data "111", and if the position change is not succeeded clockwise, said second means for outputting outputs data "000";

ninth means for checking whether the change in position from said given point toward said succeeding point is succeeded clockwise, when said fourth means for checking indicates that said data dy=0; wherein if the position change is succeeded clockwise, said fourth means for outputting outputs data "101", and if the position change is not succeeded clockwise, said second means for outputting outputs data "000"; and means for setting contents of said data dx and dy as those of said data dx1 and dy1, respectively, in accordance with said data "110", "000", "111", or "101", respectively obtained by said first, second, third and fourth means for outputting.

6. A pattern data generating system according to claim 1, wherein the change in position from said given point toward said succeeding point is succeeded counterclockwise along said closed curve, and each said data dx and dy has a value selected from the values +1, −1, and 0.

7. A pattern data generating system according to claim 6, wherein said means for writing includes a computer, comprising:

means for detecting said data dx and dy which show a change in position on the x-y plane from the given point to the succeeding point being adjacent to the given point and being located on said closed curve, and for detecting data dx1 and dy1 which show a change in position on the x-y plane from the given point to a preceding point adjacent to the given point located on said closed curve;

first means for checking the value of said data dy1 detected by said means for detecting; p1 second means for checking the value of said data dy detected by said means for detecting when said first means for checking indicates said data dy1=−1;

third means for checking whether the change in position from said given point toward said succeeding point is succeeded counterclockwise, when said first means for checking indicates said data dy1=0;

fourth means for checking the value of said data dy when said first means for checking indicates said data dy1 =+1;

first means for plotting a dot on a position on said x-y plane when said second means for checking indicates said data dy=−1;

fifth means for checking whether the change in position from said given point toward said succeeding point is succeeded counterclockwise, when said second means for checking indicates said data dy=0; wherein if the position change is succeeded counterclockwise, said first means for plotting plots a dot on x-y plane;

sixth means for checking whether the change in position from said given point toward said succeeding point is succeeded counterclockwise, when said second means for checking indicates said data dy=+1;

first means for updating coordinate data x and y of said x-y plane, when said first means for plotting plots a dot on a position on said x-y plane and for updating coordinate data x and y of said x-y plane when any of said third, fifth and sixth means for checking indicates that the position change is not succeeded counterclockwise; and second means for updating said data dx1 and dy1, in conjunction with said first means for updating said coordinate data x and y.

8. A pattern data generating system according to claim 7, wherein said computer further comprises:

second means for plotting a dot on a position on said x-y plane if said sixth means for checking indicates that the position change is succeeded counterclockwise;

third means for plotting a second dot on a position on said x-y plane, in conjunction with said second means for plotting;

seventh means for checking the value of said data dy if said third means for checking indicates that the position change is succeeded counterclockwise; wherein said first means for plotting plots a dot on a position on said x-y plane when said data dy=−1;

fourth means for plotting a dot on a position on said x-y plane, if any of said fourth and seventh means for checking indicates that said data dy=+1;

eighth means for checking whether the change in position from said given point toward said succeeding point is succeeded counterclockwise, when said fourth means for checking indicates said data dy=−1; wherein if the position change is succeeded counterclockwise, said second means for plotting plots a dot on said x-y plane, and if the position change is not succeeded counterclockwise, said first means for plotting plots a dot on said x-y plane; and ninth means for checking whether the change in position from said given point toward said succeeding point is succeeded counterclockwise, when said fourth means for checking indicates said data dy=0; wherein if the position change is succeeded counterclockwise, said first means for plotting plots a dot on said x-y plane, and if the position change is not succeeded counterclockwise, said first means for plotting plots a dot on said x-y plane.

9. A pattern data generating system for generating pattern data used to fill a region encircled by a closed curve on a bit map, said bit map being defined on an x-y plane on which a scan line is presented, said pattern data generating system comprising:

a bit map memory cell array for storing data of the bit map;

means for generating data dx and dy representing a change in position on the x-y plane between a given point of the closed curve and a succeeding point, being adjacent to said given point, on the closed curve;

means, being responsive to said data dx and dy, for writing into said bit map memory cell array a first position data of one end of a line component formed on said scan line to be filled, and for writing into said bit map memory a second position data which is shifted by one dot of the bit map outside the other end of said line component;

means for detecting logical EXOR $b_0'$, $b_1'$ . . . $b(w-2)'$ from data of points $b_0$, $b_1$, . . . , $b(j-1)$, and writing data of said EXOR $b_0'$, $b_1'$, . . . , $b(w-2)'$ into said bit map memory at locations respectively corresponding to said points $b_0$, $b_1$, . . . , $b(j-1)$, wherein parameters w and j are integers provided that $0<j<w$, and said scan line contains w points $b_0$, $b_1$, . . . , $b(w-1)$;

an x-counter for counting said data dx to provide an x count value;

a column decoder, coupled to said x-counter, for outputting column data corresponding to said x count value;

a y-counter for counting said data dy to provide a y count value;

a row decoder, coupled to said y-counter, for outputting row data corresponding to said y count value;

said bit map memory cell array coupled to said column decoder nd said row decoder nd being addressed in accordance with said column and row data;

a code generator for generating a code in accordance with contents of said data dx and dy;

a row data buffer, coupled to said bit map memory cell array and said code generator, and being responsive to said code, for performing a filling operation with respect to data stored in said bit map memory cell array.

10. A pattern data generating system for generating pattern data used to fill a region encircled by a closed curve on a bit map, said bit map being defined on an x-y plane on which a scan line is presented, said pattern data generating system comprising:

a bit map memory for storing data of the bit map;

means for generating data dx and dy representing a change in position on the x-y plane between a given point of the closed curve and a succeeding point, being adjacent to said given point, on the closed curve;

means, being responsive to said data dx and dy, for writing into said bit map memory a first position data of one end of a line component formed on said scan line to be filled, and for writing into said bit map memory a second position data which is shifted by one dot of the bit map outside the other end of said line component;

means for detecting logical EXOR b0', b1'. . . b(w−2)' from data of points b0, b1, . . . , b(j−1), and writing data of said EXOR b0', b1', . . . , b(w−2)' into said bit map memory at locations respectively corresponding to said points b0, b1, . . . , b(j−1), wherein parameters w and j are integers provided that 0<j<w, and said scan line contains w points b0, b1, . . . , b(w−1);

wherein said means for writing includes:

means for generating first data in response to said data dx;

means for generating data in response to said data dy;

hardware logic means for generating a logic code from contents of said first and second data in accordance with a predetermined truth table;

a memory, coupled to said first data providing means and said second data providing means, for storing given bit map data;

means, coupled to said memory and said hardware logic means, for performing a filling operation with respect to the bit map data stored in said memory, said filling operation being performed to be based on contents on said logic code.

11. A pattern data generating system in which, in order to fill an area surrounded by a closed curve on a bit map, x and y coordinates at a start point and coordinate changes dx and dy of each point are given as data of the closed curve which is a boundary of the area and has a direction defined as a clockwise or counterclockwise direction, each of the changes dx and dy taking any one of the values +, −1, and 0, comprising:

writing means for writing, in a bit map memory on the bases of the data dx and dy, points of all lines to be filled along a scan direction which is one direction defined on said bit map memory, such that a point on each line is written as one of two end points of the line while a second point offset by one point in the scan direction is written as the other end point of the line; and pattern data generating means for, if w points b0, b1, . . . , b(w−2), and b(w−1) are present on one scan line, writing exclusive OR data of data of points b0, b1, . . . , b(j−1) at positions corresponding to points b(j), and similarly performing data writing for all the scan lines, thereby generating pattern data in which the area surrounded by the closed curve is filled, wherein said j is a positive integer not less than 0 but less than w, and said w is a positive integer.

12. A pattern data generating system in which, in order to fill an area surrounded by a closed curve on a bit map, x and y coordinates at a start point and coordinate changes dx and dy of each point are given as data of the closed curve which is a boundary of the area and has a direction defined as a clockwise or counterclockwise direction, each of the changes dx and dy taking any one of the values +1, −1, and 0, comprising:

writing means for writing, in a bit map memory on the bases of the data dx and dy, points of all lines to be filled along a scan direction which is one direction defined on said bit map memory, such that a point on each line is written as one of two end points of the line while a second point offset by one point in the scan direction is written as the other end point of the line;

pattern data generating means for, if w points b0, b1, . . . , b(w−2), and b(w−1) are present on one scan line, writing exclusive OR data of data of points b0, b1, . . . , b(j−1) at positions corresponding to points b(j), and similarly performing data writing for all the scan lines, thereby generating pattern data in which the area surrounded by the closed curve is filled, wherein said j is a positive integer not less than 0 but less than w, and said w is a positive integer;

wherein said bit map memory is exclusively used to fill the area surrounded by said closed curve, said bit map memory being arranged such that row and column signal lines thereof respectively correspond to x and y directions of the bit map and exclusive OR data of data of the points b0, b1, . . . , b(j−1) to be written in the point b(j) is calculated for each row.

13. A pattern data generating system in which, in order to fill an area surrounded by a closed curve on a bit map, x and y coordinates at a start point and coordinate changes dx and dy of each point are given as data of the closed curve which defines a boundary of the area, each of the changes dx and dy taking any one of the values +1, −1, and 0, comprising:

writing means for writing, in a bit map memory on the bases of the data dx and dy, points of lines to be filled along a scan direction defined on said bit map memory, such that a point on each line is written as one of two end points of the line while a point offset by one point in the scan direction is written as the other end point of the line; and means for, if w points b0, b1, . . . , b(w−2), and b(w−1) are present on one scan line, writing as pattern data into said bit map memory, exclusive OR data of points b0, b1, . . , b(j−1) at positions corresponding to points b(j), wherein said j is a positive integer not less than 0 but less than w, and said w is a positive integer.

14. A pattern data generating system in which, in order to fill an area surrounded by a closed curve on a bit map, x and y coordinates at a start point and coordinate changes dx and dy of each point are given as data of the closed curve which defines a boundary of the area, each of the changes dx and dy taking any one of the values +1, −1, and 0, comprising:

writing means for writing, in a bit map memory on the bases of the data dx and dy, points of lines to be filled along a scan direction defined on said bit map memory, such that a point on each line is written as one of two end points of the line while a point offset by one point in the scan direction is written as the other end point of the line;

means for, if w points b0, b1, ..., b(w−2), and b(w−1) are present on one scan line, writing as pattern data into said bit map memory, exclusive OR data of points b0, b1, ..., b(j−1) at positions corresponding to points b(j), wherein said j is a positive integer not less than 0 but less than w, and said w is a positive integer;

wherein said bit map memory is exclusively used to fill the area surrounded by said closed curve, said bit map memory being arranged such that row and column signal lines thereof respectively correspond to x and y directions of the bit map and exclusive OR data of data of the points b0, b1, ..., b(j−1) to be written in the point b(j) is calculated for each row.

* * * * *